(12) United States Patent
Yasui et al.

(10) Patent No.: US 11,968,352 B2
(45) Date of Patent: Apr. 23, 2024

(54) DISPLAY METHOD AND SYSTEM

(71) Applicant: HONDA MOTOR CO., LTD., Tokyo (JP)

(72) Inventors: Yuji Yasui, Wako (JP); Masamitsu Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/531,827

(22) Filed: Nov. 22, 2021

(65) Prior Publication Data
US 2022/0174265 A1  Jun. 2, 2022

(30) Foreign Application Priority Data
Nov. 30, 2020  (JP) .................... 2020-198416

(51) Int. Cl.
*H04N 13/324* (2018.01)
*H04N 13/363* (2018.01)
*H04N 13/398* (2018.01)

(52) U.S. Cl.
CPC ......... *H04N 13/363* (2018.05); *H04N 13/324* (2018.05); *H04N 13/398* (2018.05)

(58) Field of Classification Search
CPC .. H04N 13/363; H04N 13/324; H04N 13/398; H04N 13/305; B60K 35/00; B60K 2370/176; B60K 2370/179; B60K 2370/188; B60K 2370/21; B60K 2370/349

See application file for complete search history.

(56) References Cited

U.S. PATENT DOCUMENTS

| 9,174,567 B2 * | 11/2015 | Lorenz ..................... B60Q 1/00 |
| 2004/0102875 A1 * | 5/2004 | Johnson ............. G01C 21/3632 701/1 |
| 2007/0177006 A1 * | 8/2007 | De Zwart .............. G02B 30/27 348/54 |
| 2008/0278298 A1 * | 11/2008 | Waeller .................. B60K 35/00 340/425.5 |

(Continued)

FOREIGN PATENT DOCUMENTS

| DE | 102007037073 A1 * | 2/2009 | ......... G01C 21/3626 |
| DE | 102012015002 A1 * | 1/2014 | .......... B62D 15/028 |

(Continued)

OTHER PUBLICATIONS

Japanese Office Action for Japanese Patent Application No. 2020-198416 dated Sep. 26, 2023.

*Primary Examiner* — Temesghen Ghebretinsae
*Assistant Examiner* — Karin Kiyabu
(74) *Attorney, Agent, or Firm* — Amin, Turocy & Watson, LLP

(57) ABSTRACT

Provided is a display method, which is executed by a display device capable of forming an image in both of an inside of a lens area and an outside of the lens area and enabling a user to visually recognize the image, the display method including displaying, by the display device, one or more objects from a predetermined area inside the lens area toward the outside of the lens area so that an object near the predetermined area is displayed in a different display mode relating to at least one of a density, a color strength, a luminance, and a size compared to an object away from the predetermined area.

12 Claims, 14 Drawing Sheets

(56) References Cited

U.S. PATENT DOCUMENTS

| | | | |
|---|---|---|---|
| 2009/0231116 A1* | 9/2009 | Takahashi | B60K 35/00 340/461 |
| 2010/0073768 A1* | 3/2010 | Kim | G02B 30/27 359/463 |
| 2010/0082234 A1* | 4/2010 | Ohta | G01C 21/3626 701/533 |
| 2010/0141414 A1* | 6/2010 | Matsumoto | B60Q 9/005 348/148 |
| 2010/0153000 A1* | 6/2010 | Akita | G01C 21/3632 715/764 |
| 2010/0222957 A1* | 9/2010 | Ohta | B60K 35/00 701/31.4 |
| 2012/0093357 A1* | 4/2012 | Seder | B60W 30/095 382/103 |
| 2013/0258488 A1* | 10/2013 | Hatakeyama | G02B 27/0101 359/630 |
| 2014/0002252 A1* | 1/2014 | Fong | G02B 27/01 340/435 |
| 2014/0092134 A1* | 4/2014 | Nagasawa | G02B 27/00 345/633 |
| 2015/0103174 A1* | 4/2015 | Emura | G06V 20/58 348/148 |
| 2015/0331487 A1* | 11/2015 | Roth | G02B 27/0101 345/156 |
| 2016/0170487 A1* | 6/2016 | Saisho | B60K 35/00 345/156 |
| 2019/0027039 A1* | 1/2019 | Takae | G08G 1/015 |
| 2020/0043244 A1* | 2/2020 | Bhushan | G06T 19/20 |
| 2021/0055813 A1* | 2/2021 | Hamano | B60K 35/00 |
| 2022/0242364 A1* | 8/2022 | Odai | G06V 20/56 |

FOREIGN PATENT DOCUMENTS

| | | |
|---|---|---|
| JP | 2005-035488 | 2/2005 |
| JP | 2010173342 A * | 8/2010 |
| JP | 2020-056607 | 4/2020 |
| JP | 2020-158014 | 10/2020 |
| JP | 2020-166542 | 10/2020 |

* cited by examiner

FIG. 16
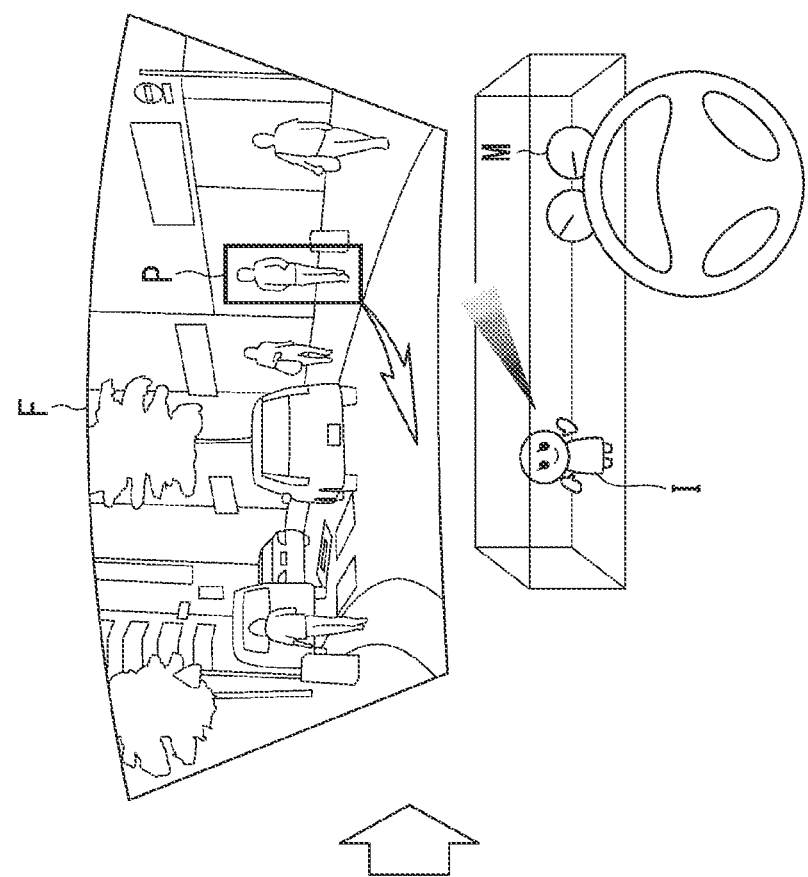
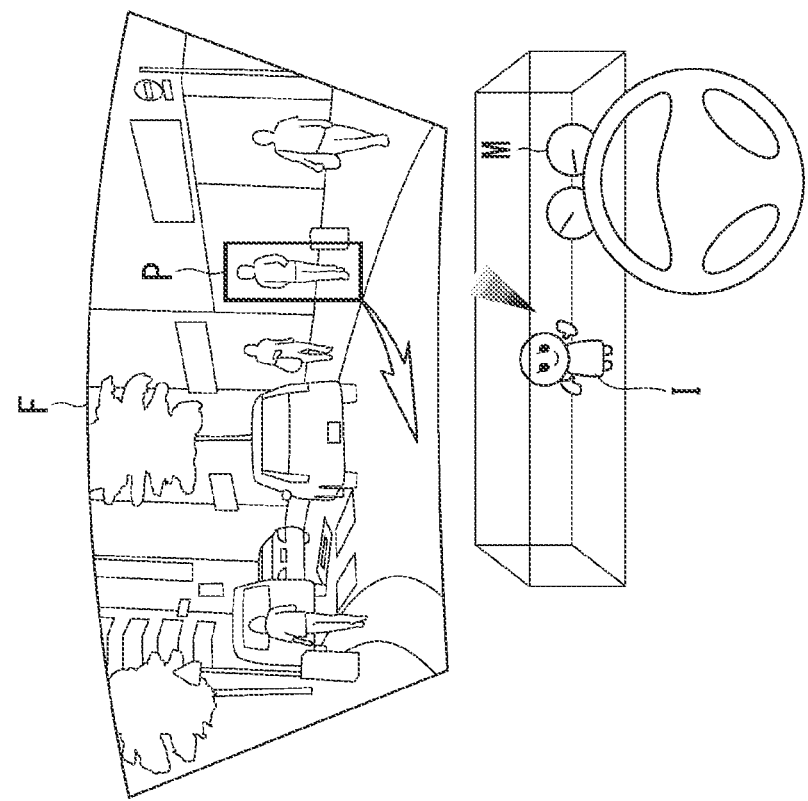

DISPLAY METHOD AND SYSTEM

CROSS-REFERENCE TO RELATED APPLICATION

The application is based on Japanese Patent Application No. 2020-198416 filed on Nov. 30, 2020, the content of which incorporated herein by reference.

BACKGROUND

Field of the Invention

The present invention relates to a display method and a system.

SUMMARY

Hitherto, the technology of detecting an obstacle near a vehicle and notifying a driver of existence of the obstacle has been known. For example, Japanese Patent Application Laid-open No. 2005-35488 discloses an obstacle detection device for a vehicle, including obstacle detection means for detecting an obstacle near a vehicle and vibration generation means for vibrating the steering wheel of the vehicle. In this obstacle detection device for a vehicle, when the obstacle detection means has detected an obstacle, the vibration generation means vibrates the steering wheel to notify the driver of existence of the obstacle.

The obstacle detection device for a vehicle disclosed in Japanese Patent Application Laid-open No. 2005-35488 switches the frequency of vibration, which is generated by the vibration generation means depending on a distance between the vehicle and the obstacle detected by the obstacle detection means, to thereby cause the driver to recognize the distance between the vehicle and the obstacle. However, the vibration of the steering wheel is limited to a horizontal direction, and thus it is not possible to cause the driver to recognize a distance between the vehicle and the obstacle in a vertical direction or a longitudinal direction. Furthermore, the driver may feel uncomfortable with vibration of the steering wheel. In this manner, the related art is not user-friendly in some cases. In order to address this issue, it is considered that spatial information is visually notified to the user, but the user feels strange about the related-art method in some cases.

The present invention has been made in view of the above-mentioned circumstances, and has an object to provide a display method and a system, which are capable of preventing a user from feeling strange when existence of an external object is spatially notified to the user.

A display method according to one embodiment of the present invention has the following configuration.

(1): A display method according to one aspect of the present invention is a display method, which is executed by a display device capable of forming an image in both of an inside of a lens area and an outside of the lens area and enabling a user to visually recognize the image, the display method including displaying, by the display device, one or more objects from a predetermined area inside the lens area toward the outside of the lens area so that an object near the predetermined area is displayed in a different display mode relating to at least one of a density, a color strength, a luminance, and a size compared to an object away from the predetermined area.

(2): In the aspect (1), the display device displays an object near the predetermined area so that the density, the color strength, the luminance, or the size of the object becomes higher than a density, a color strength, a luminance, or a size of an object away from the predetermined area and formed outside of the lens area.

(3): In the aspect (1) or (2), the display device displays an object near the predetermined area so that the density, the color strength, the luminance, or the size of the object becomes lower than a density, a color strength, a luminance, or a size of an object away from the predetermined area and formed inside of the lens area.

(4): In any one of the aspects (1) to (3), the display device displays a character image, and the predetermined area is an area close to the character image or an area including at least a part of the character image.

(5): In any one of the aspects (1) to (4), the display device displays a character image, and the display device determines a position of display of the character image through an operation performed by the user.

(6): In any one of the aspects (1) to (5), the display device continuously displays the one or more objects from the predetermined area toward a specific location outside the lens area.

(7): In the aspect (6), the specific location is a risk determination location acquired by external recognition means.

(8): In the aspect (6) or (7), the display device sets a degree of difference in the display mode depending on a distance between the specific location and the display device.

(9): In the aspect (8), the display device increases widths of the one or more objects as a distance between the specific location and the display device becomes smaller.

(10): In any one of the aspects (1) to (9), the display device decreases visibility of an image formed outside of the lens area compared to visibility of an image formed inside of the lens area.

(11): In any one of the aspects (1) to (10), the display device is a display device having lenticular lens structure.

(12): In any one of the aspects (1) to (11), the display device is mounted on a mobile body.

(13): In the aspect (12), the display device displays an object so that when the user in the mobile body has not visually recognized the specific location, the density, the color strength, the luminance, or the size of the object becomes higher compared to a case in which the user in the mobile body has visually recognized the specific location.

(14): In the aspect (12), the display device subjects the one or more objects to blur processing more and displays the one or more objects as illuminance of the outside of the mobile body becomes lower.

(15): In the aspect (12), the display device increases a degree of difference in the display mode when the user in the mobile body has not visually recognized the specific location compared to a case in which the user in the mobile body has visually recognized the specific location.

(16): A system according to one aspect of the present invention is a system, which is configured to control a display device capable of forming an image in both of an inside of a lens area and an outside of the lens area and enabling a user to visually recognize the image, the system including: a display controller configured to control display by the display device; and a display mode determiner configured to determine a mode of display by the display device, wherein the display controller displays one or more objects from a predetermined area inside the lens area toward the outside of the lens area so that an object near the predetermined area is displayed in a different display mode relating to at least one of a density, a color strength, a luminance, and a size compared to an object away from the predetermined area.

According to the aspects (1) to (16), it is possible to prevent a user from feeling strange when existence of an external object is spatially notified to the user.

According to the aspect (9), it is possible to enable the user to more reliably recognize existence of an external object close to a vehicle and having a high risk of collision.

According to the aspect (13) or (15), it is possible to more reliably notify the user who has looked aside during driving of the risk of collision.

According to the aspect (14), it is possible to enable the user to visually recognize an object without feeling fatigue of eyes.

BRIEF DESCRIPTION OF THE DRAWINGS

FIG. 16 is a diagram for describing a situation in which the mode of display of an object by the display device changes in synchronization with movement of the position of display of the character image.

DESCRIPTION OF EMBODIMENTS

Figure 1:
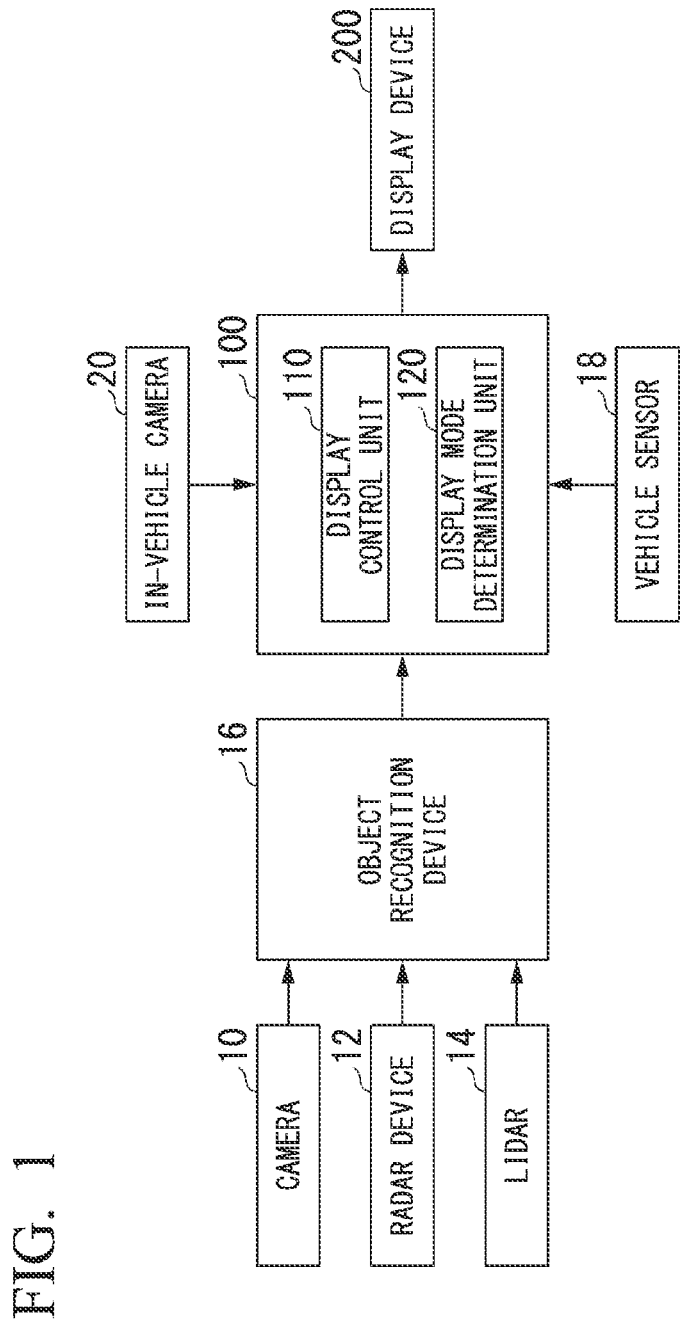
FIG. 1 is a block diagram illustrating a device mounted on a vehicle.

Now, description is given of an embodiment of the present invention with reference to the drawings. FIG. 1 is a block diagram illustrating a device mounted on a vehicle 1. The vehicle 1 includes a camera 10, a radar device 12, a LIDAR (Light Detection and Ranging) device 14, an object recognition device 16, a vehicle sensor 18, an in-vehicle camera 20, a control device 100, and a display device 200. The vehicle 1 is an example of the "mobile object", and a component including a part or all of the camera 10, the radar device 12, the LIDAR device 14, and the object recognition device 16 is an example of the "external recognition device".

The camera 10 is a digital camera that uses a solid-state image pickup device such as a CCD (Charge Coupled Device) sensor or CMOS (Complementary Metal Oxide Semiconductor) sensor. The camera 10 is mounted on any part of the vehicle 1. The camera 10 is mounted on the upper part of a front windshield, the back surface of a rear-view mirror, or the front part of the vehicle body, for example. When a rear-view image is picked up, the camera 10 is mounted on the upper part of a rear windshield or a rear door, for example. When a side-view image is picked up, the camera 10 is mounted on a door mirror, for example.

The radar device 12 is configured to radiate a radio wave such as a millimeter wave toward the surroundings of the vehicle 1, and detect a radio wave (reflected wave) reflected by a nearby external object, to thereby detect at least the position (distance and direction) of the external object. The radar device 12 is mounted on any part of the vehicle 1. The radar device 12 may detect the position and speed of the external object by an FM-CW (Frequency Modulated Continuous Wave) method.

The LIDAR device 14 is configured to radiate light toward the surroundings of the vehicle 1, and measure the diffused light. The LIDAR device 14 detects a distance between the vehicle and an object based on a period of time from emission of light until reception of light. Light to be radiated is, for example, pulsed laser light. The LIDAR device 14 is mounted on any part of the vehicle 1.

The object recognition device 16 is configured to execute sensor fusion processing for the results of detection by a part or all of the camera 10, the radar device 12, and the LIDAR device 14, and recognize, for example, the position, type, and speed of the nearby external object of the vehicle 1. The external object includes, for example, another vehicle (for example, nearby vehicle within a predetermined distance), a pedestrian, a bicycle, and a road structure. The road structure includes, for example, a road sign, a traffic light, a railway crossing, a curb, a center divider, a guardrail, and a fence. Furthermore, the road structure may include, for example, road markings such as a road partition line (hereinafter referred to as "partition line") drawn or attached on the road surface, a pedestrian crossing, a bicycle crossing, and a stop line. Furthermore, the external object may include an obstacle such as a fallen object (for example, a cargo of another vehicle or a signboard set near the road) on the road. The object recognition device 16 outputs a recognition result to the control device 100. The object recognition device 16 may output the results of detection by the camera 10, the radar device 12, and the LIDAR device 14 to the control device 100 as they are. Furthermore, the function of the object recognition device 16 may be implemented in the control device 100.

The vehicle sensor 18 includes, for example, a vehicle speed sensor configured to detect the speed of the vehicle 1, an acceleration sensor configured to detect an acceleration, a yaw rate sensor configured to detect a yaw rate (for example, a rotational angular speed with respect to a vertical axis passing through the center of gravity of the vehicle 1), and an azimuth sensor configured to detect the direction of the vehicle 1. The vehicle sensor 18 transmits detected vehicle information to the control device 100.

Similarly to the camera 10, the in-vehicle camera 20 is a digital camera that uses a solid-state image pickup device such as a CCD (Charge Coupled Device) sensor or a CMOS (Complementary Metal Oxide Semiconductor) sensor. The in-vehicle camera 20 is installed on the center of an instrument panel of the vehicle 1, for example, and picks up an image of the space of the vehicle interior. In particular, the in-vehicle camera 20 detects an operation performed by a driver of the vehicle 1 or a vehicle occupant of a passenger seat, and transmits the detected operation to the control device 100.

The control device 100 includes, for example, a display control unit 110 and a display mode determination unit 120. Theses components are implemented by, for example, a hardware processor such as a CPU (Central Processing Unit) executing a program (software). A part or all of these components may be implemented by hardware (circuit unit including circuitry) such as an LSI (Large Scale Integration), an ASIC (Application Specific Integrated Circuit), an FPGA (Field-Programmable Gate Array), and a GPU (Graphics Processing Unit), or may be implemented by cooperation between software and hardware. The program may be stored in a storage device (storage device including non-transitory storage medium) such as an HDD (Hard Disk Drive) or flash memory in advance, or may be stored in a detachable storage medium (non-transitory storage medium) such as a DVD or a CD-ROM, and the program may be installed through attachment of the storage medium into a drive device. The control device 100 is an example of the "system".

The display control unit 110 is configured to cause the display device 200 to enable visual recognition of an image. Specifically, the display control unit 110 controls the display device 200 so as to display an image in an object display mode determined by the display mode determination unit 120 described later. The display control unit 110 further determines image information other than the display mode determined by the display mode determination unit 120, such as the range, the position, and the direction of the image.

The display mode determination unit 120 is configured to determine at least the mode of display of an object by the display device 200 based on external object information received from the object recognition device 16 and vehicle information received from the vehicle sensor 18. The display mode means, for example, a part or all of the density, the color strength, the luminance, and the size of elements forming an object. Details of the display mode determined by the display mode determination unit 120 are described later.

Figure 2:
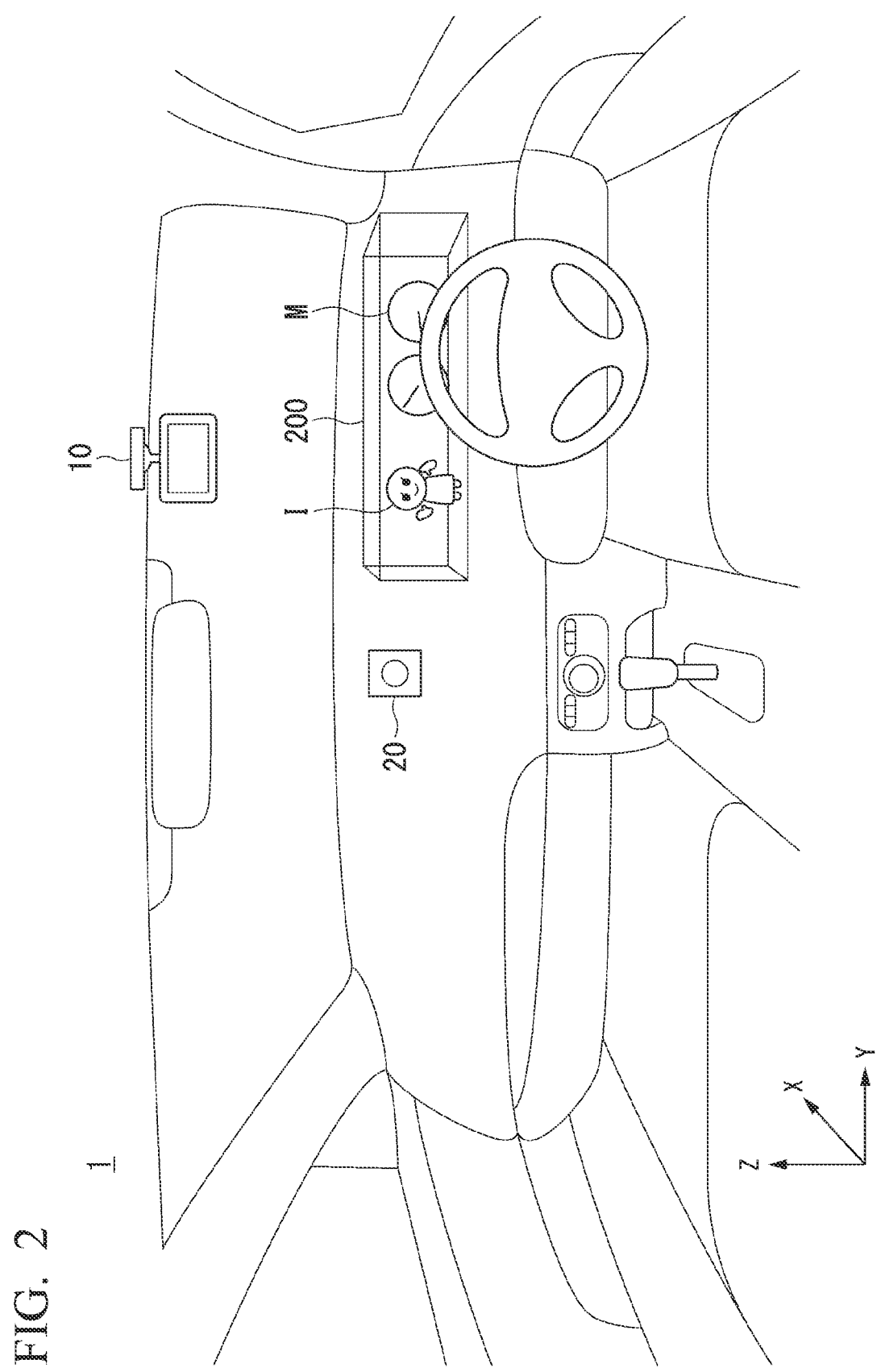
FIG. 2 is a diagram illustrating an example of a display device mounted on the vehicle.

The display device 200 is, for example, a three-dimensional display device having lenticular lens structure such as Looking Glass (trademark). The display device 200 may be a three-dimensional display device having other structure. FIG. 2 is a diagram illustrating an example of the display device 200 mounted on the vehicle 1. As illustrated in FIG. 2, the display device 200 is installed at a position of the instrument panel opposed to a driver's seat. The display device 200 displays, for example, a character image I and a speed meter M. The character image is an image representing a real or imaginary animal (including human), a plant, a robot, or another entity, and the character image is preferably an image that performs a human action through animation.

Figure 3:
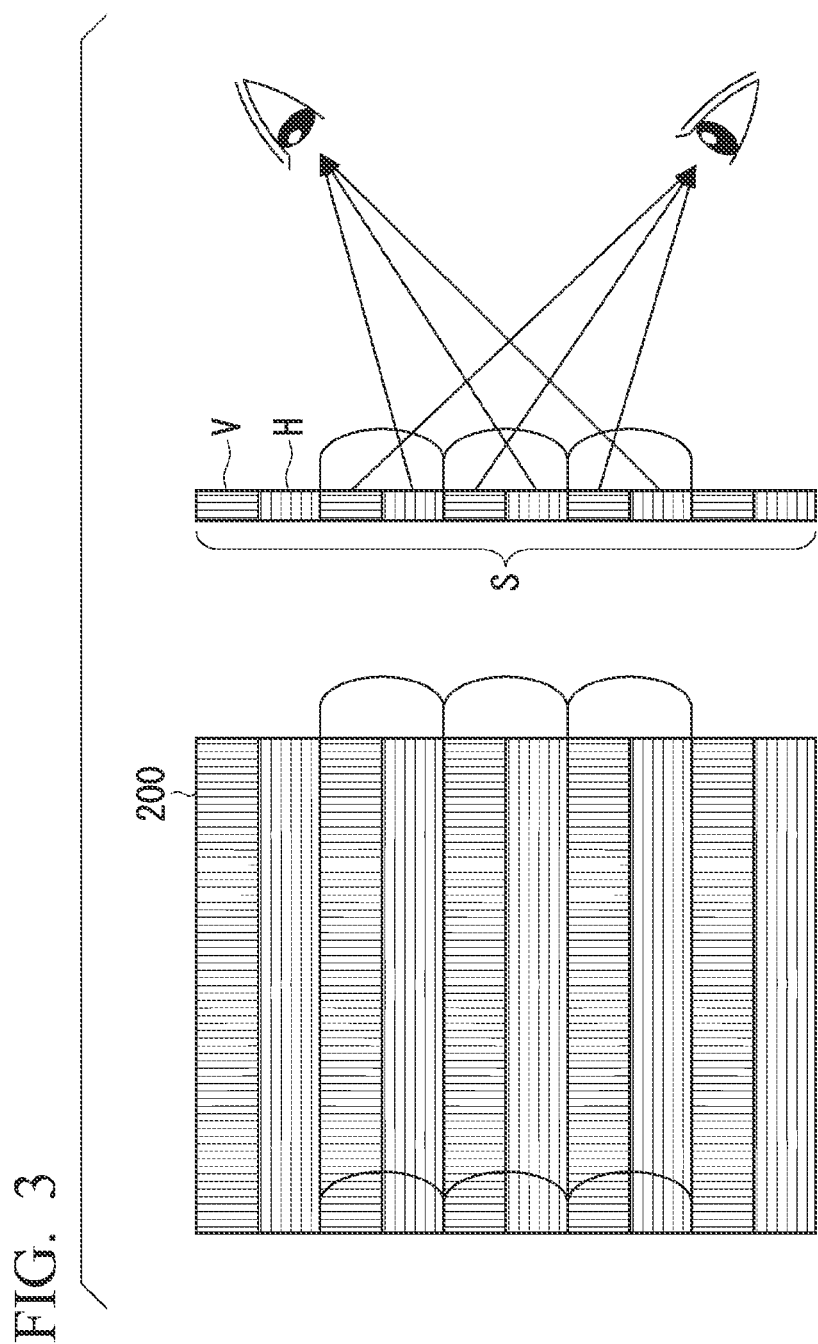
FIG. 3 is a diagram for describing the structure of a lenticular lens of the display device.

FIG. 3 is a diagram for describing the structure of a lenticular lens of the display device 200. In FIG. 3, a sheet (lenticular lens) S in which a numerous number of minute semi-cylindrical convex lenses are arranged is arranged on an image called "lenticular image", which is obtained by combining two types of images, namely, a vertical line portion V and a horizontal line portion H. The user has binocular parallax, and thus one eye recognizes an image of the vertical line portion whereas the other eye recognizes an image of the horizontal line portion through the sheet S. As a result, the user can recognize a three-dimensional image.

Figure 4:
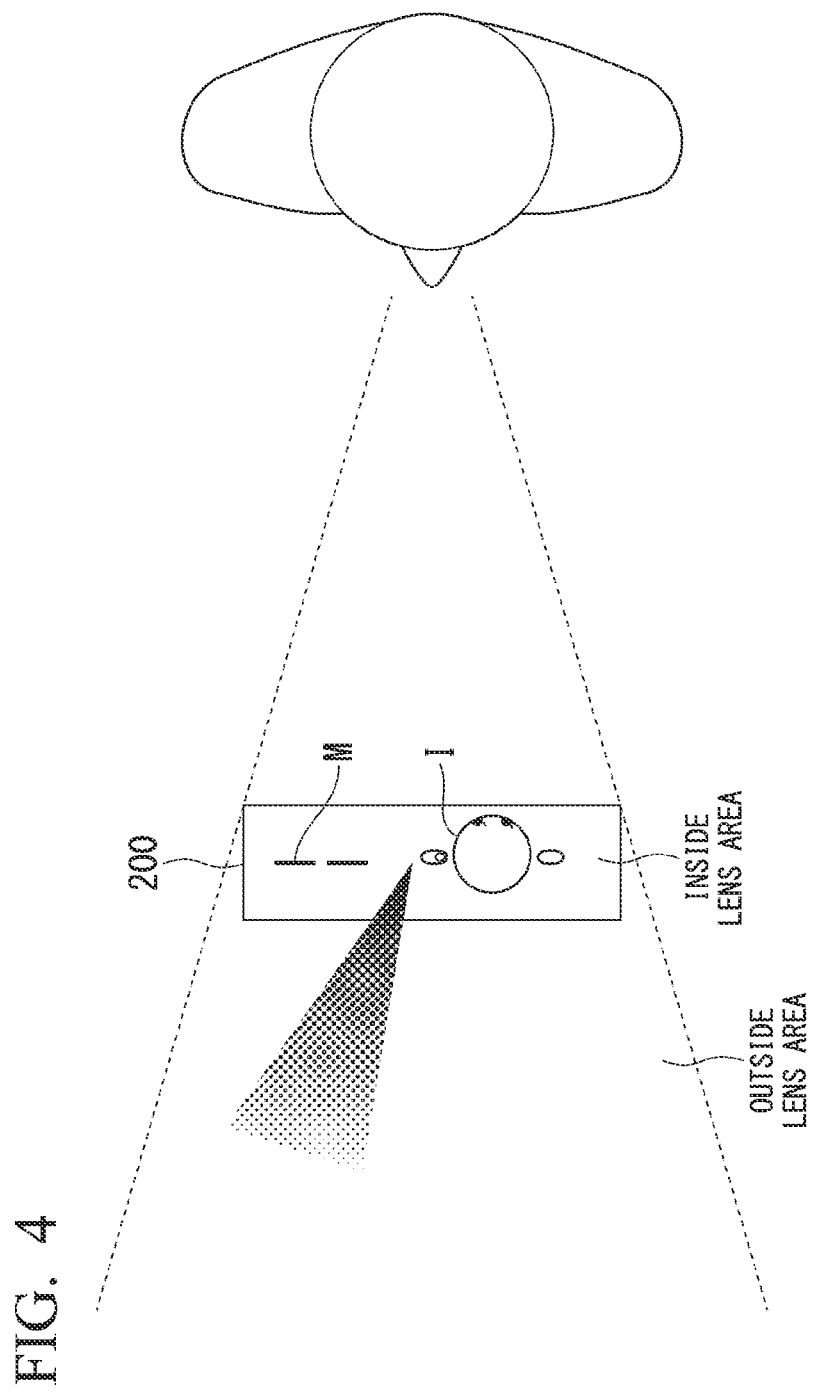
FIG. 4 is a diagram for describing the function of the display device.

FIG. 4 is a diagram for describing the function of the display device 200. In FIG. 4, the display device 200 continuously displays objects that spread toward the back of the character image I in addition to the character image I and the speed meter M. The objects are displayed in a mode of light or sand, for example. The display device 200 can form images on both of the inside and outside of a lens area, and thus the user can recognize three-dimensional objects that spread from the inside of the lens area toward the outside of the lens area. The display device 200 also has such a characteristic that the visibility of an image formed on the outside of the lens area decreases compared to the visibility of an image formed on the inside of the lens area.

In FIG. 4, the display device 200 displays objects as one continuous shape, but the method of displaying objects is not limited thereto. For example, the display device 200 may display objects as a group of a plurality of elements that are distributed intermittently, or may display objects so that a plurality of elements flow in a certain direction.

Figure 5:
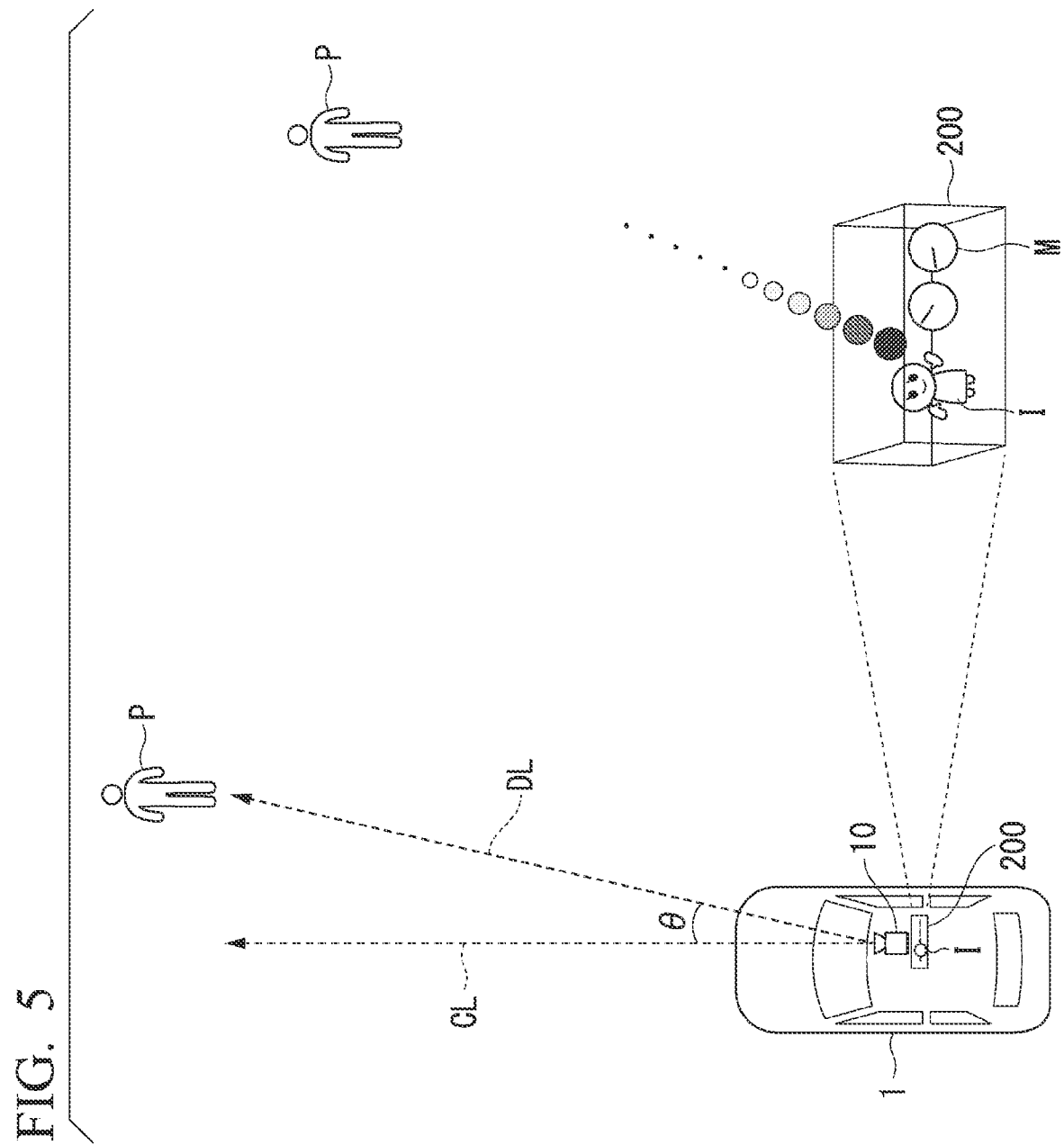
FIG. 5 is a diagram for describing a relationship between detection of an external object by a camera and display of an object by the display device.

Next, description is given of a system of notifying the user of existence of an external object near the vehicle 1 by using the camera 10 and the display device 200. FIG. 5 is a diagram for describing a relationship between detection of an external object by the camera 10 and display of the object by the display device 200. It is assumed that the camera 10 is mainly used to detect an external object in front of the vehicle 1, and a distance or angle between the vehicle 1 and the external object is measured. In FIG. 5, CL represents the vehicle body axis direction of the vehicle 1, P represents a pedestrian, DL represents a distance between the vehicle 1 and the pedestrian P, and θ represents an angle indicating the direction of the pedestrian P with respect to the vehicle body axis direction CL. The object recognition device 16 executes position transformation processing from a picked-up image space of the camera 10 onto a plane as viewed from the above, to thereby derive information on the distance DL or the angle θ (this information may further include height information). This processing may be executed by the display device 200, or may be executed by a processor included in the camera 10. The display device 200 acquires the information on the distance DL or the angle θ from the object recognition device 16.

The display control unit 110 calculates a space vector from the character image I to the pedestrian P based on the acquired information on the distance DL or the angle θ and information on a height from the character image I of the display device 200 to the camera 10. The display control unit 110 calculates the direction of the object to be displayed from the hand of the character image I toward the position of the pedestrian P based on the acquired space vector. The position of the pedestrian P is an example of the "specific location".

Next, the display mode determination unit 120 of the control device 100 determines the mode of display of the object to be displayed from the hand of the character image I toward the position of the pedestrian P based on the result of detection by the camera 10 and the result of calculation by the display control unit 110. Specifically, the display mode determination unit 120 determines, for example, the density, the color strength, the luminance, and the size of the object. The display control unit 110 of the control device 100 causes the display device 200 to display the object based on the determined display mode. The hand of the character image I is an example of the "predetermined area inside the lens".

In this manner, the display device 200 continuously displays one or more objects from a predetermined area toward a specific location outside the lens area, for example. The specific location is a risk determination location acquired by external recognition means such as the camera 10 or the object recognition device 16. The risk determination location means a location at which the vehicle 1 is determined to have a certain risk such as collision. In the example of FIG. 5, the position of the pedestrian P is an example of the risk determination location acquired by external recognition means, and the object is displayed toward the position of the pedestrian P.

In FIG. 5, point objects are displayed from the hand of the character image I toward the position of the pedestrian P. As described above, the display device 200 has such a characteristic that the visibility of an image formed on the outside of the lens area decreases compared to the visibility of an image formed on the inside of the lens area. Thus, when objects are displayed on the same mode, decrease in visibility between the inside of the lens area and the outside of the lens area becomes significant, which may cause the user to feel strange. In view of the above, when one or more objects are displayed from a predetermined area inside the lens toward the outside of the lens area, the display mode determination unit 120 determines such a display mode that when the display device 200 displays one or more objects from the predetermined area inside the lens toward the outside of the lens area, an object near the predetermined area has a different display mode relating to at least one of the density, the color strength, the luminance, and the size compared to an object away from the predetermined area. For example, in FIG. 5, the display mode determination unit 120 increases the sizes of point objects displayed near the character image I, that is, near the predetermined area, compared to the sizes of point objects away from the character image I. Furthermore, the display mode determination unit 120 deepens the colors of point objects near the character image I compared to the colors of point objects away from the character image I. Instead or in addition to this, the display mode determination unit 120 may increase the luminances of objects near the character image I compared to the luminances of objects away from the character image I. Instead or in addition to this, the display mode determination unit 120 may increase the densities of point objects near the character image I compared to the densities of point objects away from the character image I. In this manner, it is possible to reduce the visual discontinuity of objects and reduce the strange feeling of the user by determining such a display mode that an object near the predetermined area has a different display mode relating to at least one of the density, the color strength, the luminance, and the size compared to an object away from the predetermined area.

In this embodiment, the display device 200 displays objects from the hand of the character image I. However, the start point of objects, namely, the predetermined area inside the lens is not limited to the hand of the character image I, and the predetermined area inside the lens may be an area near the character image I or an area including at least a part of the character image I.

Figure 6:
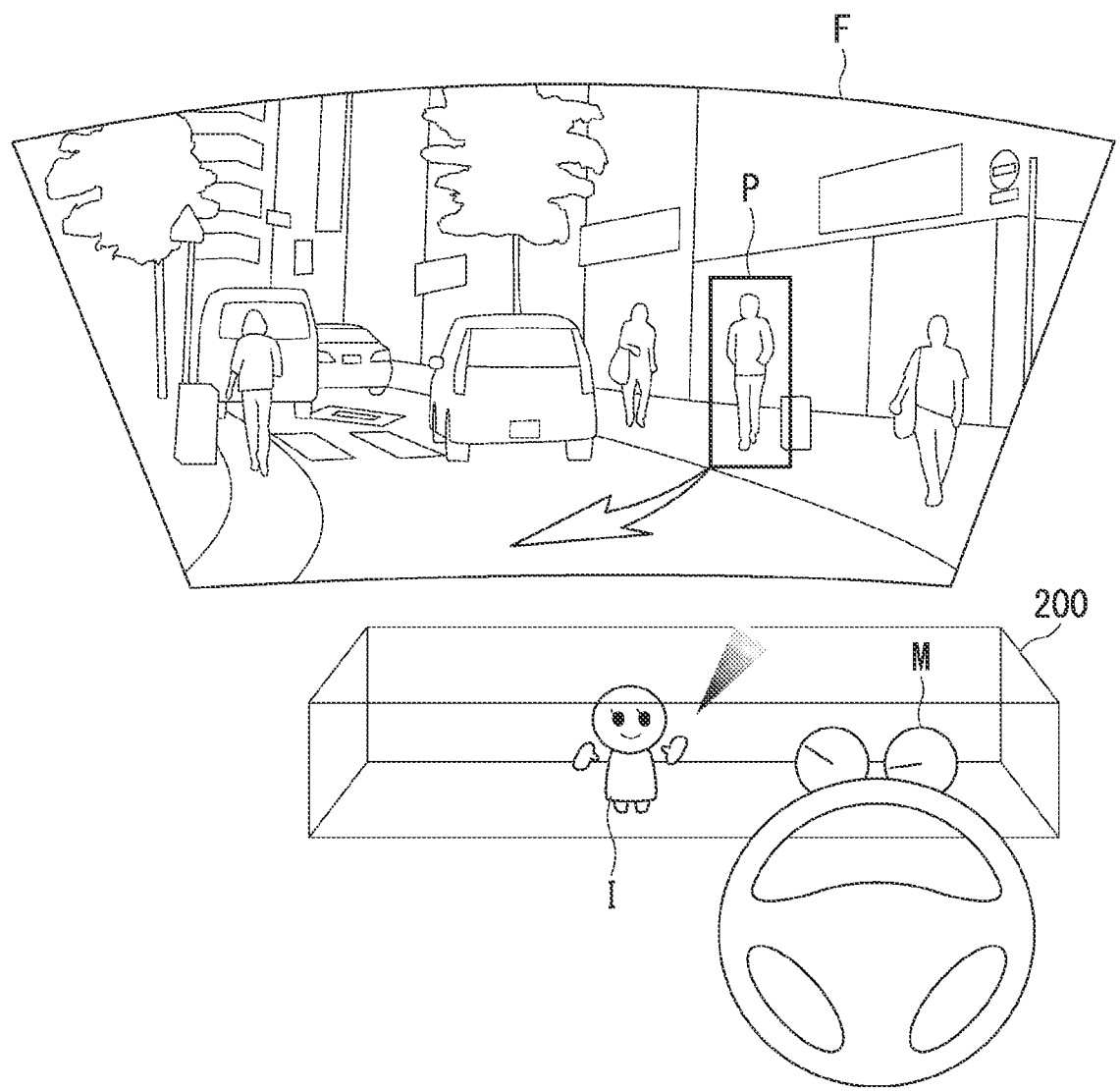
FIG. 6 is a diagram illustrating an example of a scene in which the display device is used to notify a user of existence of the detected external object.

FIG. 6 is a diagram illustrating an example of a scene in which the display device 200 is used to notify the user of existence of the detected external object. In FIG. 6, the vehicle 1 is traveling in a town, and the camera 10 confirms existence of the pedestrian P in front of the vehicle 1 on the right side through the front windshield F. The display device 200 displays a band object whose width increases from the hand of the character image I toward the position of the pedestrian P. The display mode determination unit 120 determines the mode of display of this band object such that as the points forming the band are closer to the hand of the character image I, the density and luminance of those points become higher. In this manner, it is possible to reduce the visual discontinuity of objects and reduce the strange feeling of the user by the display mode determination unit 120 determining such a display mode that objects near the predetermined area have a higher density, a higher color strength, a higher luminance, or a higher size compared to objects away from the predetermined area and whose images are formed on the outside of the lens area.

Figure 7:
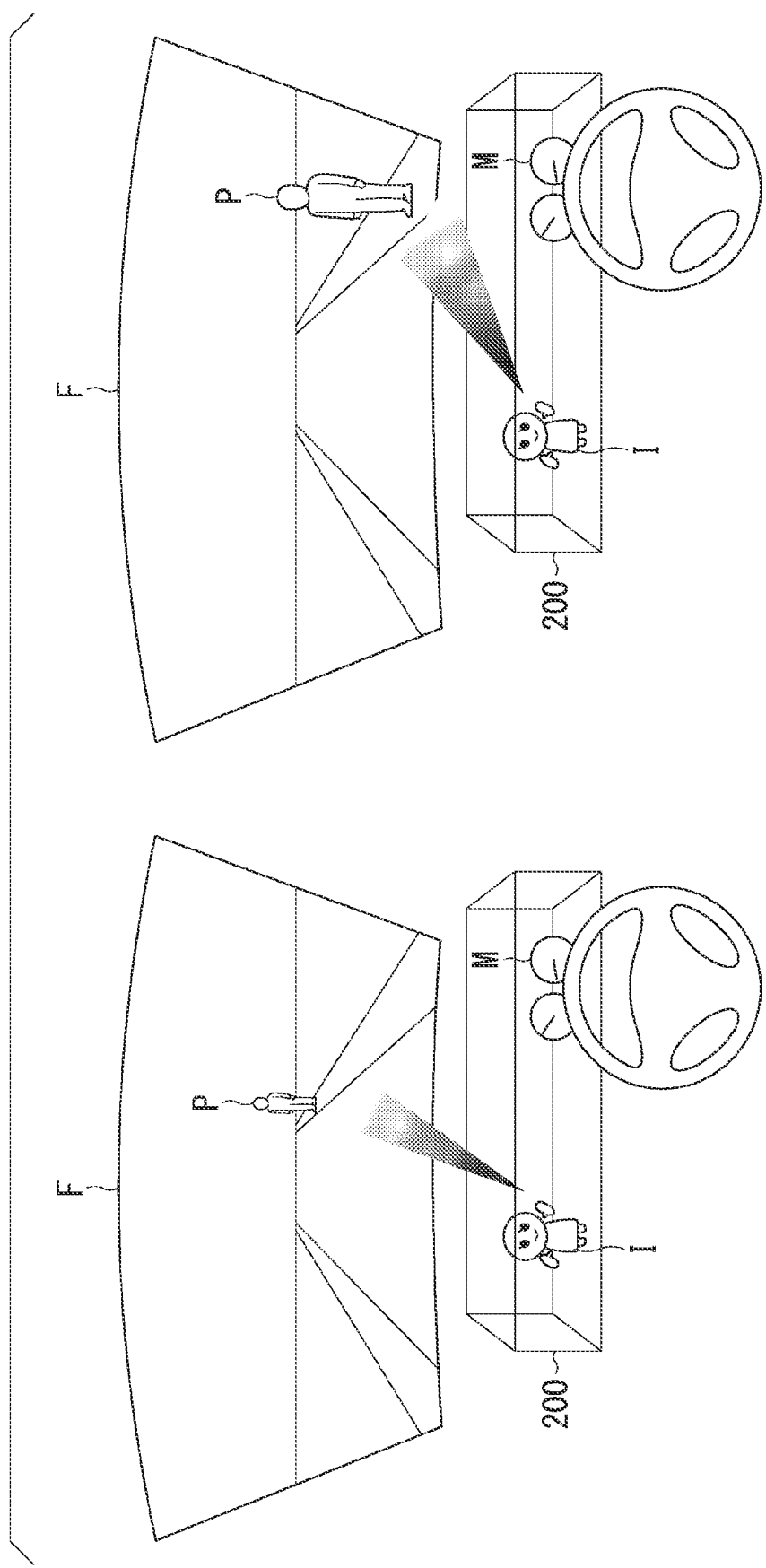
FIG. 7 is a diagram illustrating another example of the scene in which the display device is used to notify the user of existence of the detected external object.

FIG. 7 is a diagram illustrating another example of the scene in which the display device 200 is used to notify the user of existence of the detected external object. In FIG. 7, the vehicle 1 is traveling on a road, and the camera 10 confirms existence of the pedestrian P in front of the vehicle 1 on the right side through the front windshield F. On the left part of FIG. 7, the display device 200 displays a band object whose width increases from the hand of the character image I toward the position of the pedestrian P. After that, when the vehicle 1 has traveled ahead further, and the distance between the vehicle 1 and the pedestrian P becomes smaller as indicated in the right part of FIG. 7, the magnitude of the space vector from the character image I to the pedestrian P calculated by the display control unit 110 also becomes smaller. When the magnitude of the space vector has become smaller, the display mode determination unit 120 determines the mode of display of the object such that the width of the object displayed by the display device 200 becomes larger from the start point of the object toward the end point of the object. That is, the display mode determination unit 120 sets the width of one or more objects to be larger from the start point of the one or more objects toward the end point of the one or more objects as the distance between the specific location and the display device 200 becomes smaller. In this manner, the degree of difference in display mode is set depending on the distance between the specific location and the display device 200, so that the user can more reliably recognize existence of an external object close to the vehicle 1 and having a high risk of collision.

Figure 8:
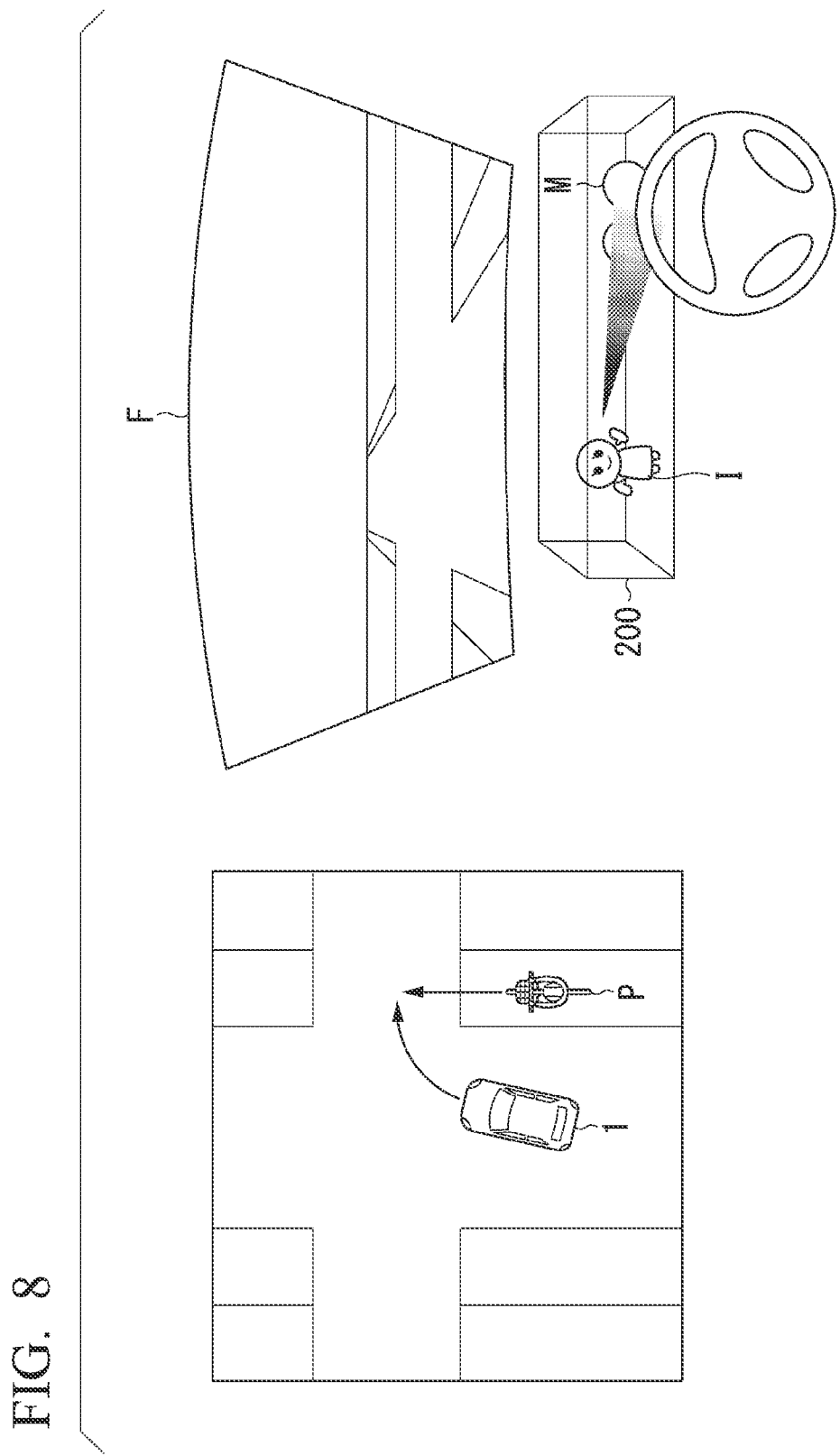
FIG. 8 is a diagram illustrating another example of the scene in which the display device is used to notify the user of existence of the detected external object.

FIG. 8 is a diagram illustrating another example of the scene in which the display device 200 is used to notify the user of existence of the detected external object. FIG. 8 is an illustration of the vehicle 1 that turns right at the intersection from the above, in which the pedestrian P riding a bicycle is approaching the vehicle 1 from the right back side of the vehicle 1. At this time, the user of the vehicle 1 cannot confirm existence of the pedestrian P through the front windshield F. However, the camera 10 recognizes existence of the pedestrian P and the display device 200 displays an object from the hand of the character image I toward the position of the pedestrian P, so that the user can visually recognize existence of a bicycle that cannot be recognized in the visual field of the user.

Figure 9:
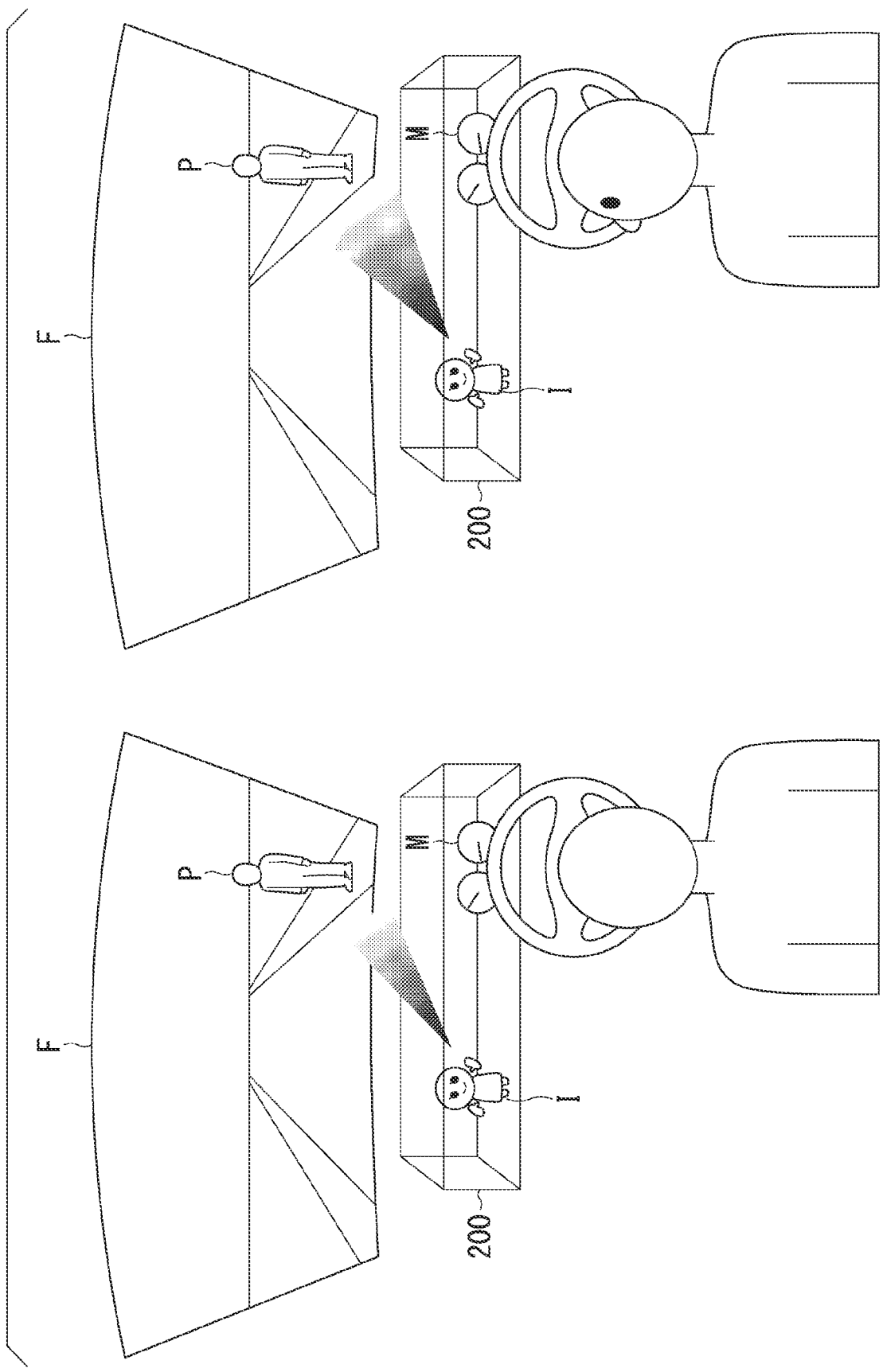
FIG. 9 is a diagram illustrating another example of the scene in which the display device is used to notify the user of existence of the detected external object.

FIG. 9 is a diagram illustrating another example of the scene in which the display device 200 is used to notify the user of existence of the detected external object. On the left part of FIG. 9, the user of the vehicle 1 is looking forward and driving the vehicle 1, and the pedestrian P is standing in front of the vehicle 1 on the right side. The display device 200 displays an object from the hand of the character image I toward the position of the pedestrian P. Now, it is assumed that the user has looked aside while driving the vehicle 1. In that case, the in-vehicle camera 20 detects that the user has looked aside, and transmits the information to the control device 100 via the object recognition device 16. The display mode determination unit 120 of the control device 100 determines the mode of display of the object so as to increase the width of the object displayed by the display device 200 in response to the fact that the user has looked aside. The display device 200 displays the object so as to increase the width of that object based on the determined display mode. In this manner, when the user in the vehicle 1 is not visually recognizing a specific location, the degree of difference in display mode is increased compared to a case in which the user is visually recognizing the specific location, so that it is possible to notify the user who has looked aside of the risk of collision more reliably.

In FIG. 9, the display device 200 displays an object so as to increase the width of that object when the user has looked aside. Alternatively, when the user in the vehicle 1 is not visually recognizing a specific location, the display device 200 may display an object so as to increase the density, the color, the luminance, or the size of points forming the object compared to a case in which the user is visually recognizing the specific location. Also with this technique, it is possible to notify the user who has looked aside of the risk of collision more reliably.

Figure 10:
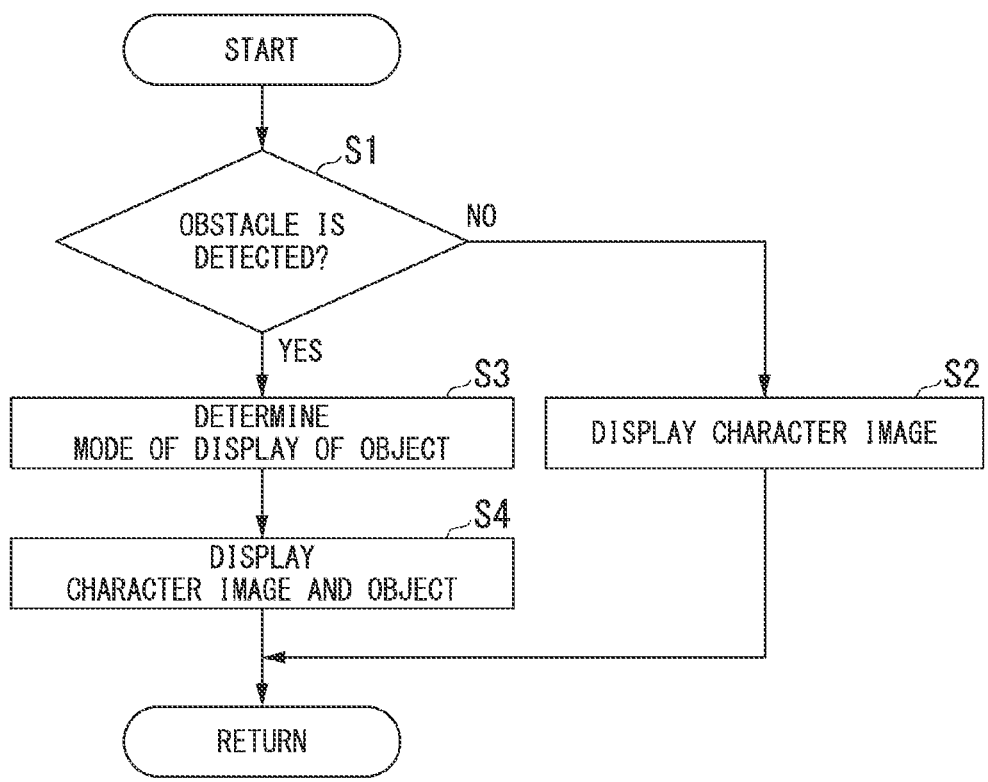
FIG. 10 is a flow chart illustrating an example of a flow of operations of a control device.

FIG. 10 is a flow chart illustrating an example of a flow of operations of the control device 100. The processing of this flow chart is started at a predetermined timing, such as a timing at which the power supply of the vehicle 1 is turned on, and is repeatedly executed at a predetermined cycle after that, for example.

First, the display control unit 110 of the control device 100 determines whether or not an obstacle is detected near the vehicle 1 based on the object information acquired from the object recognition device 16 (Step S1). The display control unit 110 determines that an obstacle is detected near the vehicle 1 when there is a moving object within a radius of 200 m with respect to the vehicle 1, for example.

When an obstacle is not detected near the vehicle 1, the display control unit 110 of the control device 100 displays only the character image I on the display device 200 (Step S2). After that, the control device 100 returns the processing to Step S1, and executes determination again. As a result, the processing of this flow chart is started when the power source of the vehicle 1 is turned on, and only the character image I is always displayed while an obstacle is not detected near the vehicle 1.

When an obstacle is detected near the vehicle 1, the display mode determination unit 120 of the control device 100 determines, based on the external object information acquired from the object recognition device 16, the mode of display of an object to be displayed from the hand of the character image I toward the position of the obstacle (Step S3). The display device 200 of the control device 100 displays the character image I and an object based on the determined display mode (Step S4). After that, the control device 100 returns the processing to Step S1, and executes determination again. As a result, for example, when an obstacle is detected near the vehicle 1 while the vehicle 1 is traveling, the display device 200 displays both of the character image I and an object, and after that, when the obstacle is sufficiently away from the vehicle 1, the display device 200 displays only the character image I.

Figure 11:
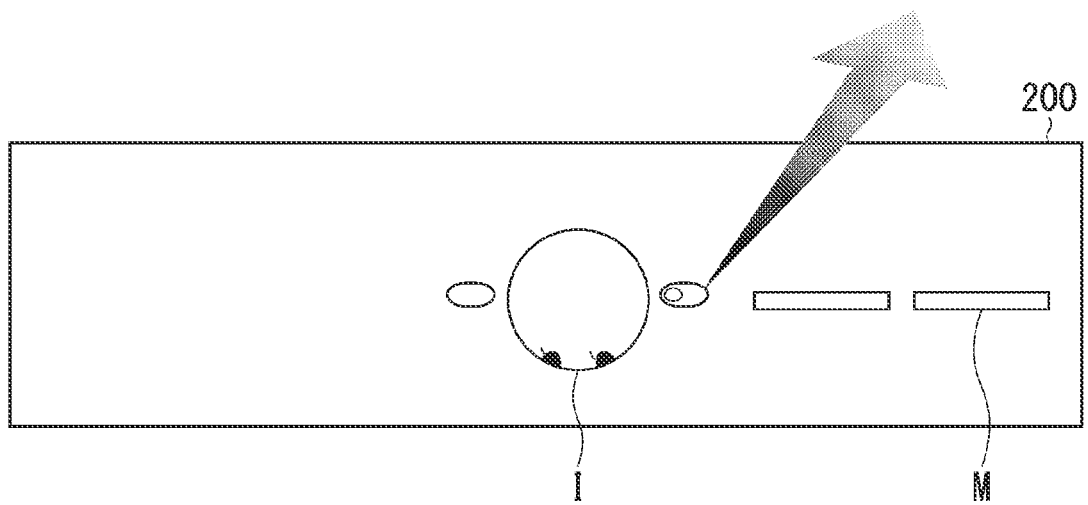
FIG. 11 is a diagram illustrating an example of a mode of display of an object by the display device.
Figure 12:
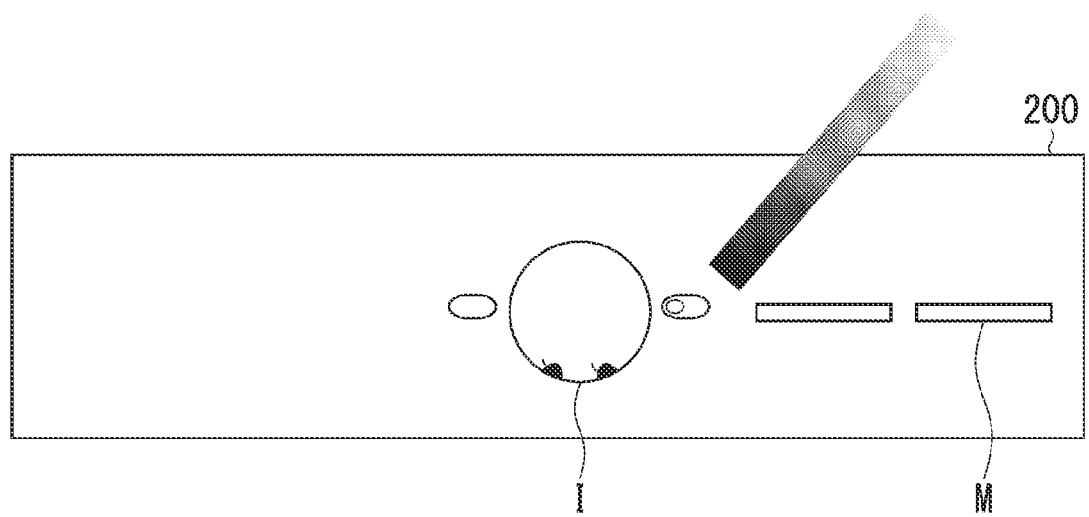
FIG. 12 is a diagram illustrating another example of the mode of display of an object by the display device.
Figure 13:
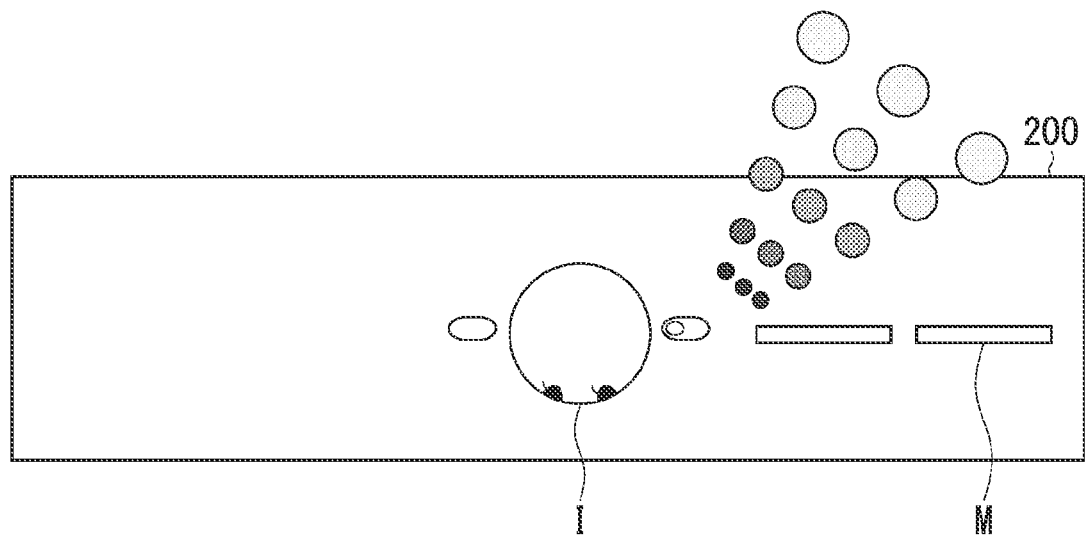
FIG. 13 is a diagram illustrating another example of the mode of display of an object by the display device.

Next, referring to FIG. 11 to FIG. 13, description is given of various kinds of examples of the mode of display of an object by the display device 200. FIG. 11 is a diagram illustrating an example of the mode of display of an object by the display device 200. In FIG. 11, the display device 200 displays an arrow object that expands from the hand of the character image I toward the position of the external object. As the arrow object is closer to the hand of the character image I, the density of points forming the arrow object becomes higher, and the luminance becomes higher. As a result, it is possible to reduce the visual discontinuity of objects, which occurs due to decrease in visibility between the inside of the lens area and the outside of the lens area, and reduce the strange feeling of the user.

FIG. 12 is a diagram illustrating another example of the mode of display of an object by the display device 200. In FIG. 12, the display device 200 displays a band object with a fixed width from the hand of the character image I toward the position of the external object. As the band object becomes closer to the hand of the character image I, the luminance becomes higher. In this manner, similarly to the case of FIG. 11, it is possible to reduce the visual discontinuity of objects and reduce the strange feeling of the user.

FIG. 13 is a diagram illustrating another example of the mode of display of an object by the display device 200. In FIG. 13, the display device 200 displays a plurality of point objects from the hand of the character image I toward the position of the external object. As the plurality of point objects become closer to the hand of the character image I, the density of the plurality of point objects become higher. In this manner, similarly to the cases of FIG. 11 and FIG. 12, it is possible to reduce the visual discontinuity of objects and reduce the strange feeling of the user.

Figure 14:
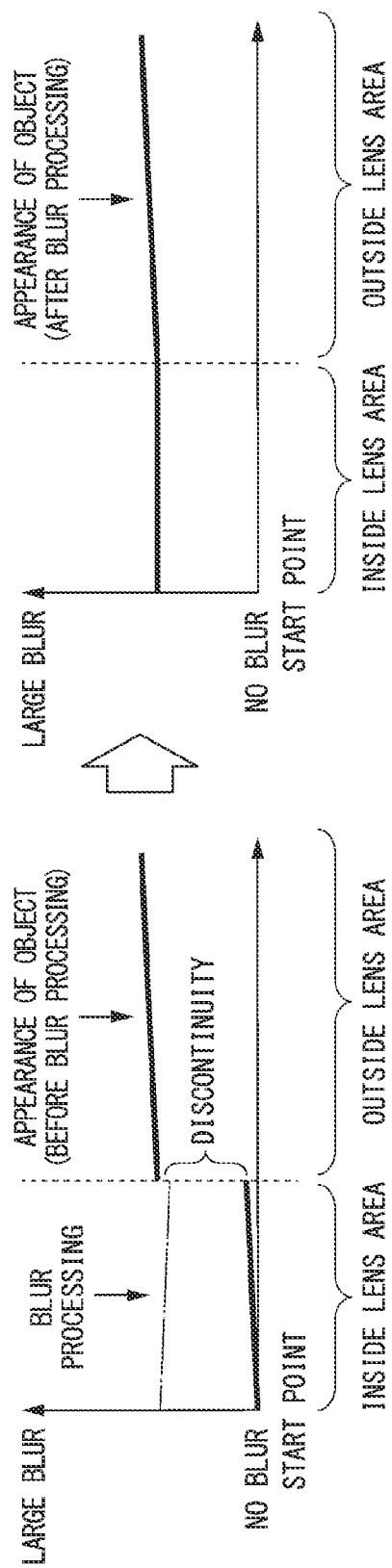
FIG. 14 is a diagram for describing blur processing for a lens area of the display device.

Next, description is given of the technique of reducing the visual discontinuity of objects, which occurs between the inside of the lens area and the outside of the lens area. FIG. 14 is a diagram for describing blur processing for the lens area of the display device 200. The start point of the graph illustrated in FIG. 14 means the hand of the character image I.

As illustrated in the left part of FIG. 14, the user recognizes an object without feeling blur inside the lens area of the display device 200. However, blur occurs in the formed image outside the lens area, and thus the user feels the visual discontinuity of objects unless objects inside the lens area are subjected to blur processing.

In view of this, as indicated by a long dashed short dashed line of FIG. 14, the display device 200 subjects objects inside the lens area to blur processing so that the degree of blur of the inside of the lens area matches the degree of blur of the boundary between the inside of the lens area and the outside of the lens area. As a result, as illustrated in the right part of FIG. 14, the user recognizes blurred objects also in the lens area. In this manner, it is possible to reduce the visual discontinuity of objects and reduce the strange feeling of the user.

As illustrated in the left part of FIG. 14, the degree of blur recognized by the user becomes larger as the object becomes away from the start point not only outside the lens area but also inside the lens area. Thus, the display device 200 may display objects near the predetermined area so that the density of those objects becomes smaller, the color of those objects becomes lighter, the luminance of those objects becomes smaller, or the size of those objects becomes smaller compared to objects that are away from the predetermined region and formed inside the lens area. In this manner, it is possible to reduce the visual discontinuity of objects in the lens area.

Furthermore, the display device 200 may subject one or more objects to blur processing more as the illuminance of the outside of the vehicle 1 becomes lower. This is because when the illuminance of the outside of the vehicle 1 is low, the user is more likely to feel the luminance of an object more strongly, resulting in fatigue of eyes. It is possible to enable the user to visually recognize an object without feeling fatigue of eyes by subjecting objects to blur processing when the illuminance of the outside of the vehicle 1 is low.

Figure 15:
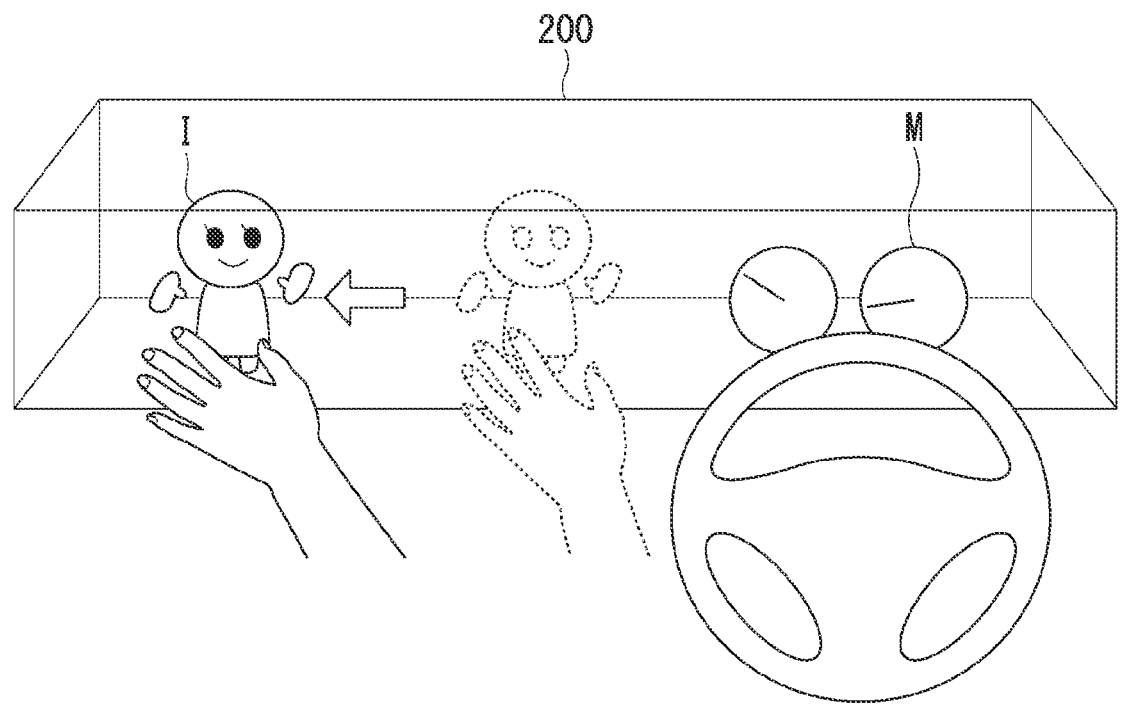
FIG. 15 is a diagram illustrating a situation in which the user moves the position of display of a character image.

Furthermore, the display device 200 may include a touch panel, and the position of display of the character image I may be determined through an operation performed by the user. FIG. 15 is a diagram illustrating a situation in which the user moves the position of display of the character image I. As illustrated in FIG. 15, the user moves the character image I, which has been arranged on the left side of the speed meter M, toward the left side further by touching a position in the left direction with respect to the display device 200. In this manner, when the character image I is bothering the user, the user can move the character image I away from the user, or in contrast, when the user intends to use the character image I more effectively, the user can move the character image I closer to the user. Alternatively, determination of the position of display of the character image I may be implemented by using the in-vehicle camera 20 and detecting the motion of the hand of the user.

FIG. 16 is a diagram for describing a situation in which the mode of display of an object by the display device 200 changes in synchronization with movement of the position of display of the character image I. Similarly to the case of FIG. 6, the vehicle 1 is traveling in a town, and the camera 10 confirms existence of the pedestrian P in front of the vehicle 1 on the right side through the front windshield F. As illustrated in FIG. 16, the mode of display of an object also changes in synchronization with movement of the character image I. This is because when the character image I moves, a vector from the character image I of the display device 200 to the camera 10 also changes, which also changes a vector from the character image I to the pedestrian P calculated by the display control unit 110. The display mode determination unit 120 determines the mode of display of an object based on the changed vector, and the display device 200 displays an object based on the determined display mode. That is, the display device 200 can flexibly display an object in synchronization with movement of the character image I by the user.

According to the embodiments described above, when the display device 200 displays one or more objects from a predetermined area of a lens toward an outside of a lens area, the display device 200 displays an object near the predetermined area in a different display mode relating to at least one of a density, a color strength, a luminance, and a size compared to an object away from the predetermined area. In this manner, it is possible to prevent the user from feeling strange when spatially notifying the user of existence of an external object.

The above-mentioned embodiments can be expressed in the following manner.

A control device including a storage device having stored thereon a program and a hardware processor, the hardware processor executing the program stored in the storage device to cause a display device, which is capable of forming an image in both of an inside of a lens area and an outside of the lens area and enabling a user to visually recognize the image, to display one or more objects from a predetermined area inside the lens area toward the outside of the lens area so that an object near the predetermined area is displayed in a different display mode relating to at least one of a density, a color strength, a luminance, and a size compared to an object away from the predetermined area.

This concludes the description of the embodiment for carrying out the present invention. The present invention is not limited to the embodiment in any manner, and various kinds of modifications and replacements can be made within a range that does not depart from the gist of the present invention.

What is claimed is:

1. A display method, which is executed by a display device capable of displaying a character image inside a lens area and of forming an image in both of the inside of the lens area and an outside of the lens area and enabling a user to visually recognize the image, the display method comprising displaying, by the display device, one or more objects from the character image toward a specific location outside of the lens area so that an object near the character image is displayed in a different display mode relating to at least one of a density, a color strength, a luminance, and a size compared to an object away from the character image, wherein a position of the character image is determined through an operation performed by the user and the specific location outside of the lens area is a risk determination location acquired by external recognition means, wherein the display method further comprises displaying, by the display device, when the risk determination location acquired by the external recognition means is located behind the user, the one or more objects from the character image toward the risk determination location located behind the user, wherein the display device is a display device having a lenticular lens structure, and wherein the display device subjects the one or more objects inside of the lens area of the lenticular lens structure to blur processing.

2. The display method according to claim 1, wherein the display device displays an object near the specific location so that a density, a color strength, a luminance, or a size of the object near the specific location becomes higher than a density, a color strength, a luminance, or a size of an object away from the specific location and formed outside of the lens area.

3. The display method according to claim 1, wherein the display device displays an object near the specific location so that a density, a color strength, a luminance, or a size of the object near the specific location becomes lower than a density, a color strength, a luminance, or a size of an object away from the specific location and formed inside of the lens area.

4. The display method according to claim 1, wherein the display device determines a position of display of the character image through a touch operation performed by the user on a touch panel of the display device.

5. The display method according to claim 1, wherein the display device sets a degree of difference in the display mode depending on a distance between the specific location and the display device.

6. The display method according to claim 5, wherein the display device increases widths of the one or more objects as the distance between the specific location and the display device becomes smaller.

7. The display method according to claim 1, wherein the display device decreases visibility of an image formed outside of the lens area compared to visibility of an image formed inside of the lens area.

8. The display method according to claim 1, wherein the display device is mounted on a mobile body.

9. The display method according to claim 8, wherein the display device displays an object so that when the user in the mobile body has not visually recognized the specific location, the density, the color strength, the luminance, or the size of the object becomes higher compared to a case in which the user in the mobile body has visually recognized the specific location.

10. The display method according to claim 8, wherein the display device subjects the one or more objects to blur processing and displays the one or more objects, as illuminance of the outside of an mobile body becomes lower.

11. The display method according to claim 8, wherein the display device increases a degree of difference in the display mode when the user in the mobile body has not visually recognized the specific location compared to a case in which the user in the mobile body has visually recognized the specific location.

12. A system, which is configured to control a display device capable of displaying a character image inside a lens area and of forming an image in both of the inside of the lens area and an outside of the lens area and enabling a user to visually recognize the image, the system comprising:
- a display controller configured to control display by the display device; and
- a display mode determiner configured to determine a mode of display by the display device,
- wherein the display controller causes the display device to display one or more objects from the character image toward a specific location outside of the lens area so that an object near the character image is displayed in a different display mode relating to at least one of a density, a color strength, a luminance, and a size compared to an object awayfrom the character image,
- wherein a position of the character image is determined through an operation performed by the user and the specific location outside of the lens area is a risk determination location acquired by external recognition means,
- wherein when the risk determination location acquired by the external recognition means is located behind the user, the display controller causes the display device to display the one or more objects from the character image toward the risk determination location located behind the user,
- wherein the display device is a display device having a lenticular lens structure, and
- wherein the display device subjects the one or more objects inside of the lens area of the lenticular lens structure to blur processing.

* * * * *